Patented Dec. 6, 1938

2,139,603

UNITED STATES PATENT OFFICE 2,139,603

VARNISHED PAPER

Arthur Reilly, Westbrook, Maine, assignor to S. D. Warren Company, Boston, Mass., a corporation of Massachusetts No Drawing. Application August 20, 1936, Serial No. 97,080

15 Claims. (Cl. 91—68)

This invention relates to the treatment of bodies, especially in the form of sheets, with an aqueous dispersion of a varnish containing drying oil derivatives. The invention is concerned not only with the treating process and with the treated product but also with the hereinafter described treating compositions.

Varnishes in most general satisfactory use comprise a drying oil with resin, either natural or synthetic, dispersed therein. Such varnishes, however, drying as they do by oxidation, are in general unsuitable for application to material which must be dried quickly, as for example a web of paper. Where quick drying is essential, use is made of "spirit-varnish", that is, resin or other film-forming material dissolved in a volatile organic solvent, e. g., alcohol. Spirit-varnish is relatively expensive to use because of the loss of solvent or of the cost of recovery equipment if the solvent is to be reclaimed. Likewise some fire hazard is entailed by the use of cheaper solvents, while more expensive non-flammable solvents are generally toxic and so constitute a health hazard to operators. Furthermore, the film left by such varnishes comprising the cheaper resins is in general not as flexible as is desired for many purposes.

Satisfactory use has been made in some cases of shellac dispersed in aqueous alkali. Attempts have likewise been made to disperse other resins and oils in alkali especially in combination with casein. The films resulting from such applications, however, usually are quite unlike a true varnish film.

It is, accordingly, an object of this invention to provide a varnish film similar in appearance and other qualities to a drying-oil varnish film, but which may be dried quickly by moderate heat. It is a further object to coat sheet material with a water-dispersed varnish which upon drying becomes water-insoluble and relatively impenetrable to moisture. It is also an object of the invention to provide a quick-drying aqueous varnishing composition adapted peculiarly for varnishing paper or like material. Other objects will appear from the following disclosure.

In accordance with the present invention, it is found that a very satisfactory varnishing or coating composition for sheet material may be prepared by dispersing resinous material in an aqueous solution of ammonium soap of fatty acids derived from drying oils. It is found that when a composition comprising ammoniacal drying-oil soap and resin and/or ammonium resinate is allowed to evaporate in film form either at normal or elevated temperature the ammonia and the water are liberated, leaving the varnish constituents behind in a water-resistant condition quite similar to an ordinary drying-oil varnish residue. It is apparent that the speed and ease of drying such a film are very advantageous in instances where webs of material are to be quickly reeled up after treatment.

There may be used in the practice of this invention any resin dispersible in the soap solution: either saponifiable resins, such as rosin; or unsaponifiable resins, such as para-coumarone. From consideration of ease of manipulation those resins are preferred which can be saponified easily by ammonia or which disperse easily in ammonium soap solutions. Manila copal is an example of a resin especially satisfactory for the purpose, because of its comparatively low cost, its ease of dispersibility and the desirable character of the resulting film. Manila copal is available which can be practically completely saponified by ammonia to yield a soap that dissolves easily to give a fairly concentrated solution which can be filtered and diluted with ease.

Drying oils suitable for use in accordance with the present invention include linseed, perilla, poppy, soy bean, tung, and the like. The ammonium soap thereof may be prepared by saponifying the oil directly with ammonia, in which case the glycerine remains in the solution and may be beneficial in promoting flexibility, as when the mixture is used to impregnate flexible sheet material. In most cases, however, it is preferable to make the soap from the drying oil fatty acids previously separated from the glycerine.

Resin acids and drying oil acids may be mixed together and saponified at the same time if desired, but generally it is preferable to prepare the soaps separately, since variations in proportions may then be made more easily.

The ratio of fatty acid soap to resin in the composition will naturally vary depending upon the particular acids and resins being used, and upon the stock to which the composition is to be applied. The resin gives hardness to the film, while the fatty acids give flexibility. The two must be balanced against each other to give the result desired in any particular case. In general the quantity of resin used should be great enough to avoid stickiness in the dried film. In cases where the mixture is used for impregnation of material so porous that little varnish remains on the surface as a film, a higher proportion of drying-oil soap may be used to advantage. In general, I prefer so to adjust the relative contents of drying oil acids and resin that their weights bear the ratio of 1 to from 1½ to 7½.

In some cases it has been found desirable to expedite the oxidation of the fatty acids by incorporating in the composition a metallic drier such as is customarily used in paint and varnish. For example, a soap of cobalt, lead, manganese or zinc may be dispersed in the ammonium soap used, or may be emulsified by other means and then added to the composition. It is also convenient to use an ammoniacal solution of the metal, such as is formed, for instance, by treating a solution of cobalt salt with ammonia and redissolving the precipitated metal hydrate in excess ammonia. When a metallic drier is employed, I prefer to add it in the ratio of 1 part by weight of metal to from 100 to 10,000 parts by weight of the fatty acids content of the composition.

If desired, an anti-foaming agent, e. g. fusel oil, pine oil, or the like, may be added to the composition to decrease any possible foaming tendency on the part of the soap solution.

The concentration of solids in the composition naturally will vary depending upon the method of application, the weight of layer to be applied, and the base to be varnished or coated. For application to a paper web upon a coating machine of the blade or air-brush type, a concentration of from 20 to 30 per cent of solids is satisfactory. A paper-web may be coated, in the manner indicated, with a coating weighing (when dried) 6 to 8 pounds per ream of 500 sheets cut 25 x 38 inches, dried by hot air, and reeled up, if desired, within 30 seconds or less from the time of application of the coating.

If the coating composition is applied to a relatively dense surface, as for instance, to a super calendered paper or to a coated paper or fabric, the film may be dried to a smooth, glossy surface, very attractive in appearance, which may serve to render the sheet so treated a satisfactory substitute for more expensive lacquered material. If desired, the sheet may be calendered after the coating operation to remove any cockle that the wetting of the base may have produced. Whether or not the calendering operation is necessary depends largely upon the character of the base stock.

The coated paper with the smooth glossy surface described takes letter-press printing and halftone reproductions very satisfactorily. The ink dries thereon with a high gloss or shine, making it unnecessary to apply a varnish coat subsequent to the printing operation, as is now customarily done to increase the brilliance of printed matter on many labels, posters, etc.

In case it is desired to increase the moisture-resistant properties of the coated paper, as when it is to be used for box covers, wrapping purposes, or the like, a waxy material may be incorporated in the hereinbefore described composition. Paraffin, ceresin, spermaceti, carnauba wax, or the like, may be dispersed or emulsified by stirring the melted wax into a hot aqueous solution of the drying oil soap, and the disperson may then be incorporated in the varnish mix with ease, in amounts so that up to 10 per cent or more of the total solids content of the final composition is wax. Coating compositions containing such wax when applied to a relatively impervious base, such as super calendered paper, dry with a high gloss and render the coated sheet relatively impenetrable to water-vapor. The wax content, where wax is added, may amount to from 5% to 20% by weight of the resin content of the composition.

It is obvious that the coating may be applied to a colored base stock, whereby the brilliance of the color will be considerably enhanced. If desired a dye or pigment may be incorporated in the composition itself with good results.

Specific embodiments illustrative of the invention are shown by the following examples:

Example 1

A. 80 pounds of manila copal was stirred with 32 gallons of water. 7 gallons of 26° Baumé ammonia water was added gradually and the temperature was raised at the same time. The heating and stirring were continued until the resin has dissolved. The solution was then passed through a screen to remove extraneous matter and any undissolved resin lumps.

B. 40 pounds of tung oil fatty acids was stirred into 8.5 gallons of water and 3 gallons of strong ammonia water to make a soap of butter-like consistency.

C. 15 grams of cobalt chloride was dissolved in 100 cc. of water and 100 cc. of strong ammonia, and then diluted to 1 liter.

Components A, B and C were all mixed together. A half-pint of pine oil was added to decrease foaming.

The resulting composition was then applied to one side of a machine-finished paper web of the class used as body stock for usual coated papers. An excess of the composition was applied and the surplus removed by an air-jet on a coating machine of known design. The dry weight of material left on the web was about 6 pounds per 25 x 38 inches, 500 sheet ream. The coated paper was dried by hot air and then reeled up at once. Later it was calendered on a supercalender. The paper base in this case was absorbent, so that the varnish composition struck in and gave little increase in gloss. The pores of the paper were filled so that the paper was left in suitable condition for the application of paint or lacquer.

Example 2

A varnish composition was prepared similar to that of Example 1, excepting that linseed oil acids were used in place of the tung oil acids, and the ratio of the linseed oil acids to the copal was 2 to 5 in this case.

This composition was applied to a sheet of super calendered lithographic paper, about 4 lbs. per ream, dry weight, being applied. The paper was dried and calendered. This sheet had a very high gloss and it took letter press printing well.

Example 3

A composition similar to that of Example 2, excepting that an equivalent amount of soybean oil acids was substituted for the linseed oil acids of that example, was applied to a red coated paper suitable for use as a base stock for pyroxylin lacquering. About 3 pounds of coating, dry weight, was applied.

The sheet was dried and calendered. The gloss was very high, and the brilliance of the color considerably enhanced.

Example 4

To a composition containing ammonium soaps of copal and of tung oil acids was added emulsified paraffin so that the proportions were: copal 70 parts; tung oil acids 30 parts; and paraffin 9 parts. The total solids content of the composition was 22%. A supercalendered box cover paper was coated therewith, about 10 lbs. of coating, dry weight, being applied. This paper was found to be comparable in moistureproofness to the best grades of moistureproof cellulosic wrapping material.

*Example 5*

A composition was prepared containing 20 parts ammonia-copal soap; 8 parts ammonia-tung oil acids soap, and 10 parts titanium dioxide, the total solids content being 25%. This composition was applied to a sheet of varnishable super-calendered lithographic paper and the coating was dried. The resulting gloss was very good.

It is to be understood that the various examples given above are illustrative only, and that the invention is not to be considered limited to the specific substances or proportions mentioned therein.

By the practice of this invention as hereinbefore disclosed articles may be coated with a varnish film approximating a usual drying oil varnish film, but one that may be dried as readily as a spirit-varnish film. This is done without the use of costly or hazardous solvents, and gives a simple and satisfactory method of coating paper fabric or other sheet material.

In the appended claims the term "coated" is used in its broad sense to designate a material which has been coated or impregnated. In treating materials and in particular porous fibrous materials of the nature of paper and fabric with the compositions herein disclosed, there will be in practically all cases some coating and some impregnating, although in particular instances one or the other may greatly predominate. It will be understood, therefore, that the claims are intended to include materials which have been treated with these compositions whether the treatment was primarily intended to impregnate or to coat the material.

I claim:

1. Process which comprises applying to a surface of a sheeted paper a coating of a composition consisting essentially of an aqueous solution of ammoniacal cobalt hydrate and an ammonium soap of a fatty acid derived from a drying oil, said solution containing resin dispersed therein in an amount from 1½ to 7½ times the fatty acids content, and drying the so-coated paper.

2. Process which comprises applying to a surface of a sheeted paper a coating of a composition consisting essentially of an aqueous solution of ammoniacal cobalt hydrate and an ammonium soap of a fatty acid derived from a drying oil, said solution containing resin dispersed therein in an amount from 1½ to 7½ times the fatty acids content, drying the so-coated paper and calendering the dried product.

3. Process according to claim 1, according to which the resin is dispersed in the solution in the form of an ammonium soap thereof.

4. Process which comprises applying to a surface of a sheeted paper a coating of a composition consisting essentially of manila copal resin dispersed in an aqueous solution of an ammonium soap of a fatty acid derived from a drying oil, and drying the so-coated paper.

5. The process defined in claim 1, characterized in that the resin content of the composition consists essentially of manila copal resin.

6. The process defined in claim 1, characterized in that the resin content of the composition consists essentially of an ammonium soap of manila copal resin.

7. As a new product, a fibrous sheet material provided on a surface thereof with an adherent coating of a mixture consisting essentially of a resin, a fatty acid derived from a drying oil, and the insoluble solid residue of an ammonium-cobalt compound, the ratio of fatty acid content to resin content being as 1 is to from 1½ to 7½.

8. As a new product, a fibrous sheet material provided on a surface thereof with an adherent coating of a mixture consisting essentially of a manila copal resin and a fatty acid derived from a drying oil, the ratio of fatty acid content to resin content being as 1 is to from 1½ to 7½.

9. As a new product, a sheeted paper provided on a surface thereof with an adherent coating of a mixture consisting essentially of a resin, a fatty acid derived from a drying oil, and the insoluble solid residue of an ammonium-cobalt compound, the ratio of fatty acid content to the content of resin being as 1 is to from 1½ to 7½.

10. As a new product, a sheeted paper provided on a surface thereof with an adherent coating of a mixture consisting essentially of a manila copal resin and a fatty acid derived from a drying oil, the ratio of fatty acid content to the content of manila copal resin being as 1 is to from 1½ to 7½.

11. A film-forming coating composition adapted for use in coating paper, fabric and similar fibrous sheeted material, consisting essentially of a resin dispersed in an aqueous solution of ammoniacal cobalt hydrate and an ammonium soap of a fatty acid derived from a drying oil, the ratio of fatty acid content to resin content being as 1 is to from 1½ to 7½.

12. A film-forming coating composition adapted for use in coating paper, fabric and similar fibrous sheeted material, consisting essentially of an aqueous solution of ammoniacal cobalt hydrate, an ammonium soap of a resin and ammonium soaps of fatty acids derived from a drying oil, the ratio of fatty acid content to resin content being as 1 is to from 1½ to 7½.

13. The composition defined in claim 11, characterized in that the resin content thereof consists essentially of manila copal resin.

14. The composition defined in claim 12, characterized in that the resin soap content thereof consists essentially of an ammonium soap of manila copal resin.

15. A film-forming coating composition adapted for use in coating paper, fabric and similar fibrous sheeted material, consisting essentially of manila copal resin dispersed in an aqueous solution of ammonium soaps of fatty acids derived from a drying oil of the group consisting of linseed, perilla, poppy, soy bean, and tung oils, the ratio of fatty acids content to resin content in said composition being as 1 is to from 1½ to 7½.

ARTHUR REILLY.